US005955852A

United States Patent [19]

Jentsch

[11] Patent Number: 5,955,852

[45] Date of Patent: Sep. 21, 1999

[54] DOOR HAVING A DOOR MANEUVERING MECHANISM HAVING A SLIDE RAIL WITH A SENSOR IN THE SLIDE RAIL

[75] Inventor: Dietrich Jentsch, Ennepetal, Germany

[73] Assignee: Dorma GmbH + Co. KG, Ennepetal, Germany

[21] Appl. No.: 09/049,319

[22] Filed: Mar. 27, 1998

Related U.S. Application Data

[63] Continuation-in-part of application No. PCT/DE97/01488, Jul. 15, 1997.

[30] Foreign Application Priority Data

Jul. 31, 1996 [DE] Germany ........................... 196 30 877

[51] Int. Cl.$^{6}$ ................................ H02P 1/00; G05B 5/00

[52] U.S. Cl. ........................... 318/282; 318/466; 318/446

[58] Field of Search .................................... 318/138, 139, 318/280–293, 439, 460; 52/243.1, 65, 241; 160/3, 133, 188, 310; 49/261, 506, 31, 140, 360, 404, 168, 409, 25, 141, 252, 260

[56] References Cited

U.S. PATENT DOCUMENTS

| | | | |
|---|---|---|---|
| 3,621,349 | 11/1971 | Reyx | 318/135 |
| 4,050,189 | 9/1977 | Peterson | 49/26 |
| 4,577,437 | 3/1986 | Gionet et al. | 49/25 |
| 4,851,746 | 7/1989 | Milke | 318/467 |
| 5,369,912 | 12/1994 | Ginzel et al. | 49/141 |
| 5,422,552 | 6/1995 | Parisi | 318/466 |
| 5,428,278 | 6/1995 | Bollengier et al . | |
| 5,540,269 | 7/1996 | Plumer | 160/3 |
| 5,544,462 | 8/1996 | Kordes | 52/243.1 |
| 5,712,546 | 1/1998 | Holthouse et al. | 318/282 |

FOREIGN PATENT DOCUMENTS

| | | |
|---|---|---|
| 9420529 | 4/1995 | Germany . |
| 4415401 | 7/1995 | Germany . |
| 4426201 | 1/1996 | Germany . |

*Primary Examiner*—Paul Ip
*Attorney, Agent, or Firm*—Nils H. Ljungman & Associates

[57] ABSTRACT

A slide rail with a guide groove and a contact side for a device for a door equipped with a slide rail door drive mechanism. A slide which is effectively connected to the door drive mechanism is mounted so that it can move axially in the guide groove. The door area has at least one sensor which is effectively connected to the door device and scans the danger zone of the range of motion of the door. The slide rail has a space adjacent to the guide groove which holds the slide. The space has at least one sensor which is used to monitor the danger zone of the door. The space can be located below, in front of or behind the guide groove.

20 Claims, 6 Drawing Sheets

DOOR HAVING A DOOR MANEUVERING MECHANISM HAVING A SLIDE RAIL WITH A SENSOR IN THE SLIDE RAIL

CONTINUING APPLICATION DATA

This application is a continuation in part application of International Application No. PCT/DE97/01488 filed on Jul. 15, 1997, which claims priority from Federal Republic of Germany Patent Application No. 196 30 877.1 filed on Jul. 31, 1996. International Application No. PCT/DE97/01488 was pending as of the filing date of this application and designated the U.S. as a designated state.

BACKGROUND OF THE INVENTION

1. Field of the Invention

The present invention relates generally to a slide rail, runner or sideway with a guide groove and a contact side for a door closer device for a door. The door closer device is equipped with a slide rail system and a drive mechanism. A slide, roller or an equivalent device, which slide is effectively connected to a drive mechanism, is mounted so that the slide can move axially. In the vicinity of the door there is at least one sensor, which sensor scans the area of door movement of the door and is effectively connected to the door closing device.

2. Background Information

Similar known slide rails are used on doors, in particular on swinging doors, and are mounted in the upper portion of the door. The slide which slides in the guide groove is generally mechanically coupled to the door drive mechanism by means of a lever or a linkage. It is also a conventional practice to connect such door drives to a sensor or sensors, which sensors are located on the door panel in the vicinity of the lintel and which sensors scan the danger zone of the range of movement of the door. The sensors emit signals to the door drive mechanism concerning the respective connection and trigger the stopping of the door as soon as a person enters the danger zone.

One disadvantage of known systems is that the connecting lines to the sensors must be laid over more or less long distances. As a result, the connecting lines are exposed to potential acts of vandalism or accidental damage.

An additional disadvantage is that known arrangements involve a significant amount of time, work and expense for construction and installation, because the connection of the door drive mechanisms to the slide rails on one hand, and the installation of the sensors and the corresponding wiring on the other hand is relatively time-consuming, primarily because the sensors and the slide rails must be installed practically in the same part of the door. For example, channels must frequently be provided in the door for the installation of the cables to be inserted, to protect the cables connecting the sensors with the door drive mechanism from damage. Damage to the connecting cable can result in the failure to detect significant hazards, because in that case, the range of motion through which the door is pushed or swung cannot be monitored, or it can be monitored only to an unsatisfactory extent. In the case of power-driven doors with automatic opening and/or closing processes, injuries can easily occur to persons standing in the danger zone.

The individual sensors can also have an extraordinarily unattractive effect on the harmonious appearance of a door, because the sensors must often be located in positions which are undesirable in terms of the overall appearance of the door. The installation plates required for assembly are also unattractive and expensive.

An additional disadvantage of known systems is that it is expensive and time-consuming to maintain an inventory of replacement parts, because a wide variety of door drive mechanisms and sensor systems must be kept in stock, which ties up a significant amount of capital and ultimately makes the product more expensive.

OBJECT OF THE INVENTION

The object of the present invention is to overcome the technical disadvantages of similar known systems, in particular the difficulty of installation. Another object of the present invention is to minimize the amount of capital that must be tied up relative to similar known systems, and simultaneously to harmonize the external appearance of a door.

SUMMARY OF THE INVENTION

The present invention teaches that this object can be accomplished in at least one embodiment by the slide rail having a space adjacent to the guide groove containing the slide. The space holds at least one sensor which is used to monitor the danger zone. The space can be underneath, in front of or behind the guide groove.

Consequently, the quantity of replacement parts which must be kept in stock is significantly smaller in terms of the variety of different combinations of door drive mechanisms and sensor systems. The assembly process simultaneously becomes significantly easier and therefore more economical, because no additional measures need to be provided, e.g. additional cable ducts in the door panels, or the sheathing of long cable connections from the sensor to the door drive.

Additionally, the slide rail of the present invention fits into the overall visual appearance of the door, whereby the wiring remains discreetly in the background. Thus, the wiring is also protected to some extent against vandalism, a phenomenon which is currently on the increase. As a result, the secure operation of the door is essentially guaranteed, and injuries caused by defective actuation of the door drive can be prevented.

In an embodiment of a slide rail of the present invention, it is particularly advantageous if the space on either side of the slide rail is delimited in the longitudinal direction by the wall which forms the contact side, and by a wall opposite the contact side which forms the front side. The side facing away from the underside of the guide groove forms an opening which permits passage of the radiation from the sensor or sensors, and which opening is equipped with a corresponding cover.

In this manner, economical standard sensors can be used because they can be installed inside the space as a function of the three-dimensional angle which must be scanned. It is also extraordinarily advantageous if the slide rail of the present invention, which slide rail can be in the form of an extruded profile, is a semi-finished product which can be used universally on all doors, a measure which significantly reduces the size of the inventory which must be maintained. Depending on the width of the door, all that is necessary is the appropriate sizing and installation of the sensors inside the space, so that it is no longer necessary to keep an inventory of combinations of different door drive mechanisms and sensor systems.

It is also advantageous if the space is enclosed by a cover which covers the space, which cover can be connected to the slide rail, and allows the passage of the radiation emitted by the sensor or sensors. The cover can be held positively or non-positively in the rear and front wall of the slide rail, e.g. it can be plugged in, inserted or clamped in place.

As a result, it becomes possible in a particularly simple manner to prevent unauthorized manipulation of the sensors. If the plug-in realization is selected for the cover, access to the space for the sensors can only be obtained by dismantling the slide rail, which effectively means that the space is no longer accessible to unauthorized persons.

Preferably, the walls which form the contact side and the front side have receptacles and the cover has corresponding matching parts. This configuration represents an additional step toward the economical manufacture of both the cover profile and the slide rail profile.

On heavy or extra-wide doors, it has been found to be particularly appropriate to locate at least one structurally and mechanically effective cavity in the vicinity of the guide groove of the slide rail of the present invention.

To fasten the slide rail to the door panel or even to the lintel, it is advantageous if the openings intended for the fastening of the slide rail are located in the lower portion of the contact side, which contact side is accessible from the front. This configuration further facilitates the installation process because drilling templates are no longer necessary to make the fastening holes in the door panel and/or in the lintel, and no additional installation plates are required.

If the slide rail of the present invention has a cover cap which surrounds the slide rail and is fastened positively and/or non-positively on one or both ends of the slide rail, then the space can also be encapsulated to keep out other environmental influences.

The installation process becomes a great deal easier if each cover cap is used to fasten the slide rail, and has at least one opening, and/or if at least one of the cover caps has pre-defined, knock-out open spaces through which the connecting lines can be run. On doors of normal width, it thereby becomes possible to eliminate additional holes which run through the contact side, and to locate the cable connections in the immediate vicinity of the door drive mechanism.

It is advantageous for the slide rail to extend approximately over the width of the door panel. As a result, the total width of the danger zone which can be scanned by the sensors on this side can also be taken into consideration.

As a result of the use of a slide rail of the present invention without a corresponding door drive mechanism, but equipped with at least one sensor, on the side of the door facing away from the door drive mechanism, for monitoring the danger zone in that area, it becomes possible to create a standardized door which can be easily adapted to meet all requirements, is easy to install and requires a minimum inventory of replacement parts, is safe and reliable in operation and can be propelled by automatic door drive mechanisms.

The use of a slide rail of the present invention is appropriate in particular even without a corresponding door drive mechanism, but with at least one sensor, on the side of the door facing away from the door drive mechanism. This configuration makes it possible to monitor the danger zone on that side of the door without any major expense or effort. The external appearance is appropriate and no specially-designed parts are required for the purpose.

In other words and in accordance with one possible embodiment of the present invention, two slide rails can be used with a door. One of the slide rails can be connected to the door drive mechanism and can monitor the danger zone on one side of the door. The other slide rail is preferably not attached to the door drive mechanism, but has a sensor to monitor the danger zone on the other side of the door.

A semi-finished profile for a slide rail of the present invention is particularly practical if, viewed in the cross section of the profile, the wall which forms the contact side has a U-shaped groove which extends axially. One of the two legs of the U-shaped groove preferably has an elevation which also extends axially.

Such a semi-finished profile can also be located on the wall which forms the front side of an at least three-legged groove which extends axially, whereby a gap which extends axially remains between the wall of the front side and the last leg.

The present invention teaches that it is possible to achieve an invisible fastening of the slide rail with the attached sensor without using an installation plate. This configuration represents a major advantage over known slide rails, and is also characterized by an aesthetically pleasing type of fastening.

In one configuration of the present invention, however, the slide rail and also the area which contains a sensor can even be integrated into one profile, which, as a transverse profile on a door, forms the upper edge. In that configuration both folding and non-folding profiles can be used. With such a profile it would not be necessary to fasten the slide rail with the sensor, because the piece in question would be a one-piece part. It would not be visible to the observer that the slide rail is simultaneously molded or shaped, because it can be significantly narrower than is normally the case. It is also possible to design the transverse profile with a receptacle for each sensor on both sides and as a slide rail, in which case only one side of the slide rail guide would be used.

From the point of view of inventory maintenance and the installation procedure, such a semi-finished profile has the primary advantage that no additional pre-fabricated slide rails need to be kept in stock. Thus, it becomes possible to take account of local conditions in a particularly easy manner simply by cutting the profile to length on site.

The present invention teaches that it is possible to realize slide rails which are particularly well protected against unauthorized interventions if the cover is in the form of a semi-finished profile, on which cover, viewed in cross section, the right and/or the left edge of the cover forms an L-shaped edge. As a result, there is a stable connection between the slide rail profile and the cover.

The above discussed embodiments of the present invention will be described further hereinbelow with reference to the accompanying figures. When the word “invention” is used in this specification, the word “invention” includes “inventions”, that is, the plural of “invention”. By stating “invention”, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying figures, wherein.

DESCRIPTION OF THE PREFERRED EMBODIMENT

Figure 1:
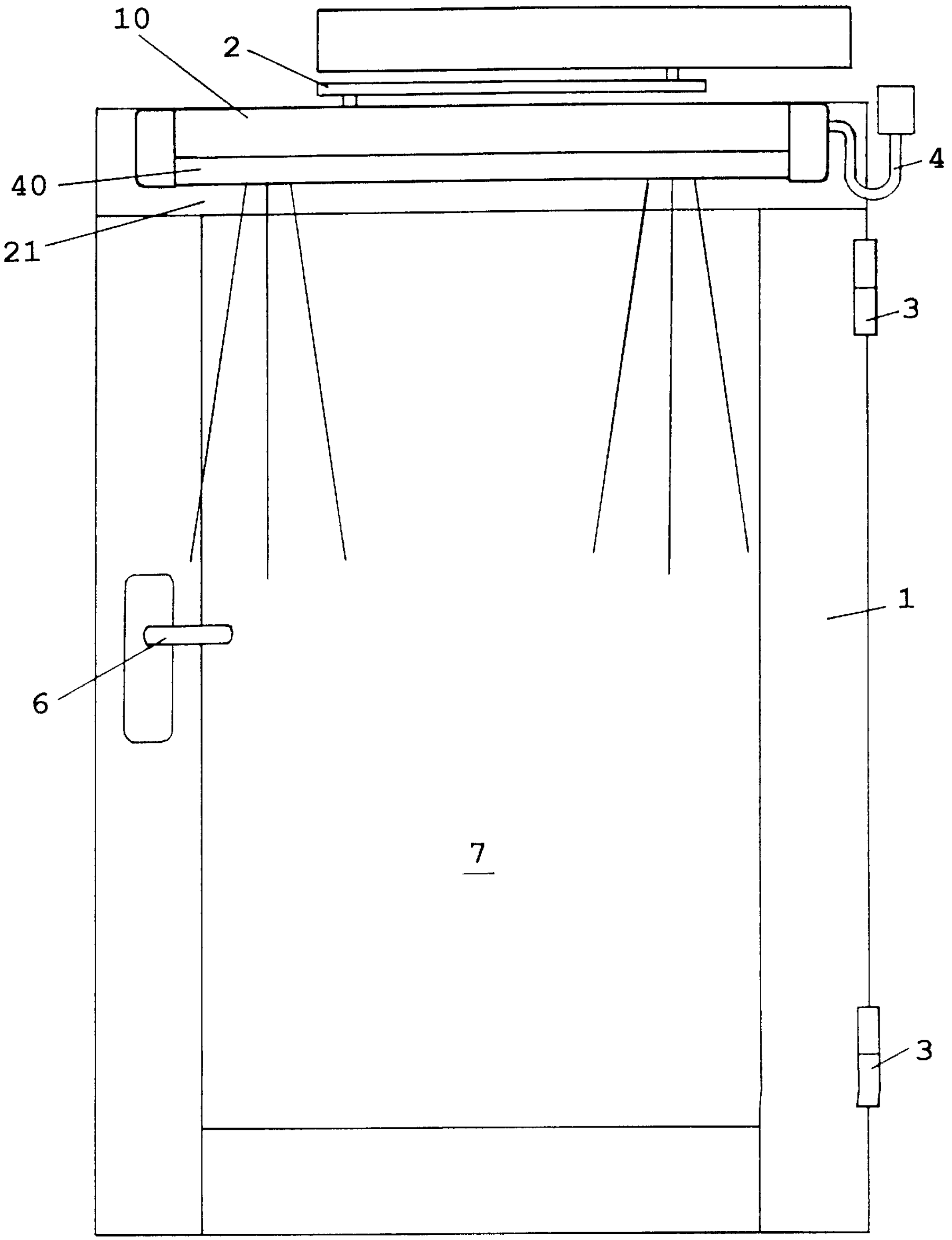
FIG. 1 is an overall view of a door with a door closer and slide rail.
Figure 6:
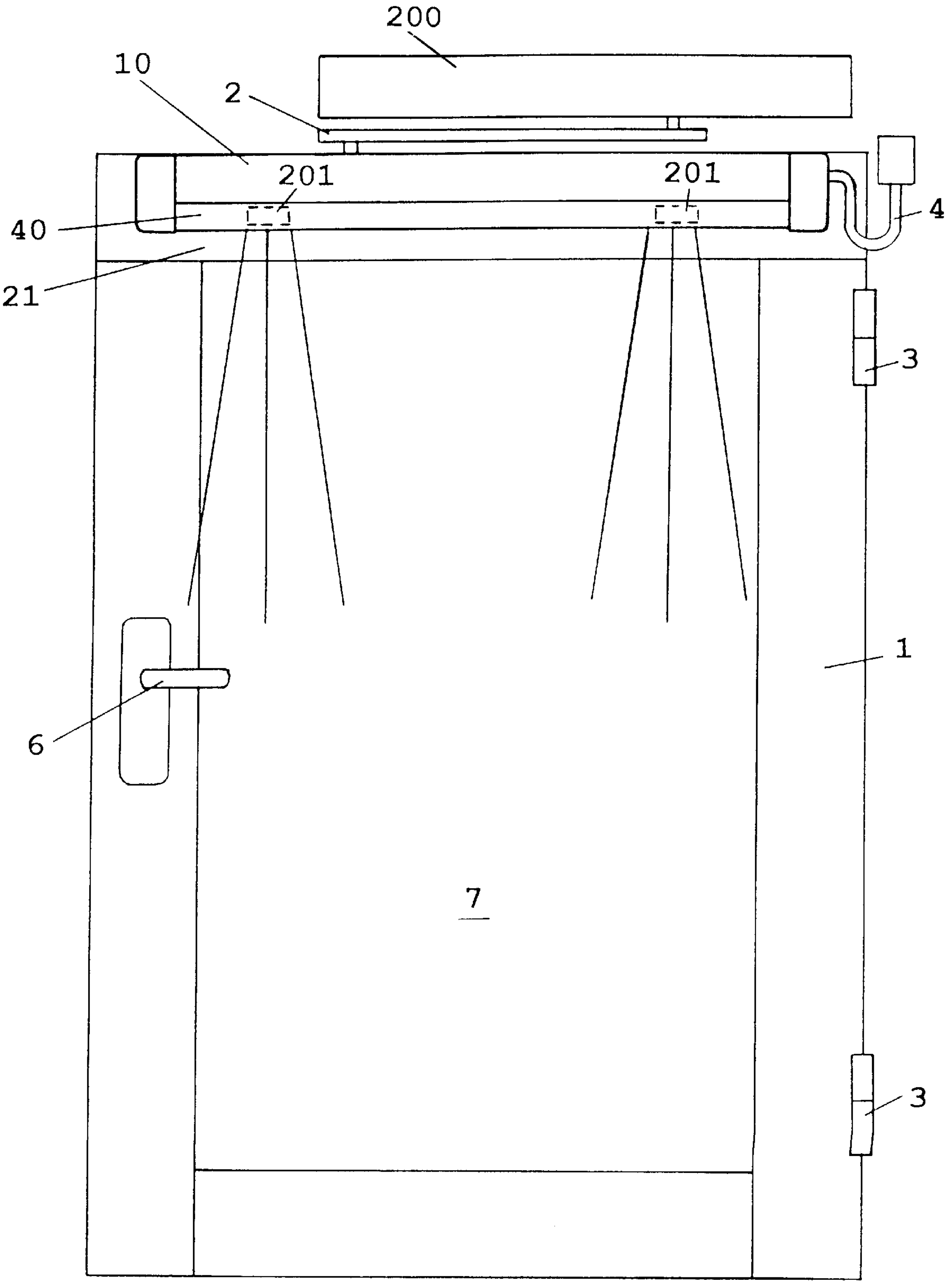
FIG. 6 shows additional features of the door of FIG. 1.

FIG. 1 shows a door with a swinging panel, a door panel 1 of the door is preferably made of frame profiles. The space enclosed by the frame profiles can be filled with glass panel 7. The door panel 1 is preferably held in place by strips 3. To activate the door there is a handle 6 with a lock (not shown) inside the frame profile. The upper edge of the frame or frame profiles can be formed by a profile 21 to which a slide rail 10 of the present invention can be attached. The slide rail 10 with at least one integrated sensor 201 (see FIG. 6) is preferably connected by a cable junction 4 to a wall and to cables which are connected to the wall. Inside the slide rail 10, a slide 20 (see FIG. 3), which slide 20 can also be a roller or any other type of movable part, can be guided by a lever 2. The other free end of the lever 2 can be connected to a door closer (not shown) or also to an electro mechanical or electro hydraulic door drive mechanism or maneuvering mechanism 200 (see FIG. 6). When the drive or door drive mechanism 200 is actuated in response to a sensor signal, the door panel 1 can be automatically opened and thus, clear the way for an approaching person.

Figure 2:
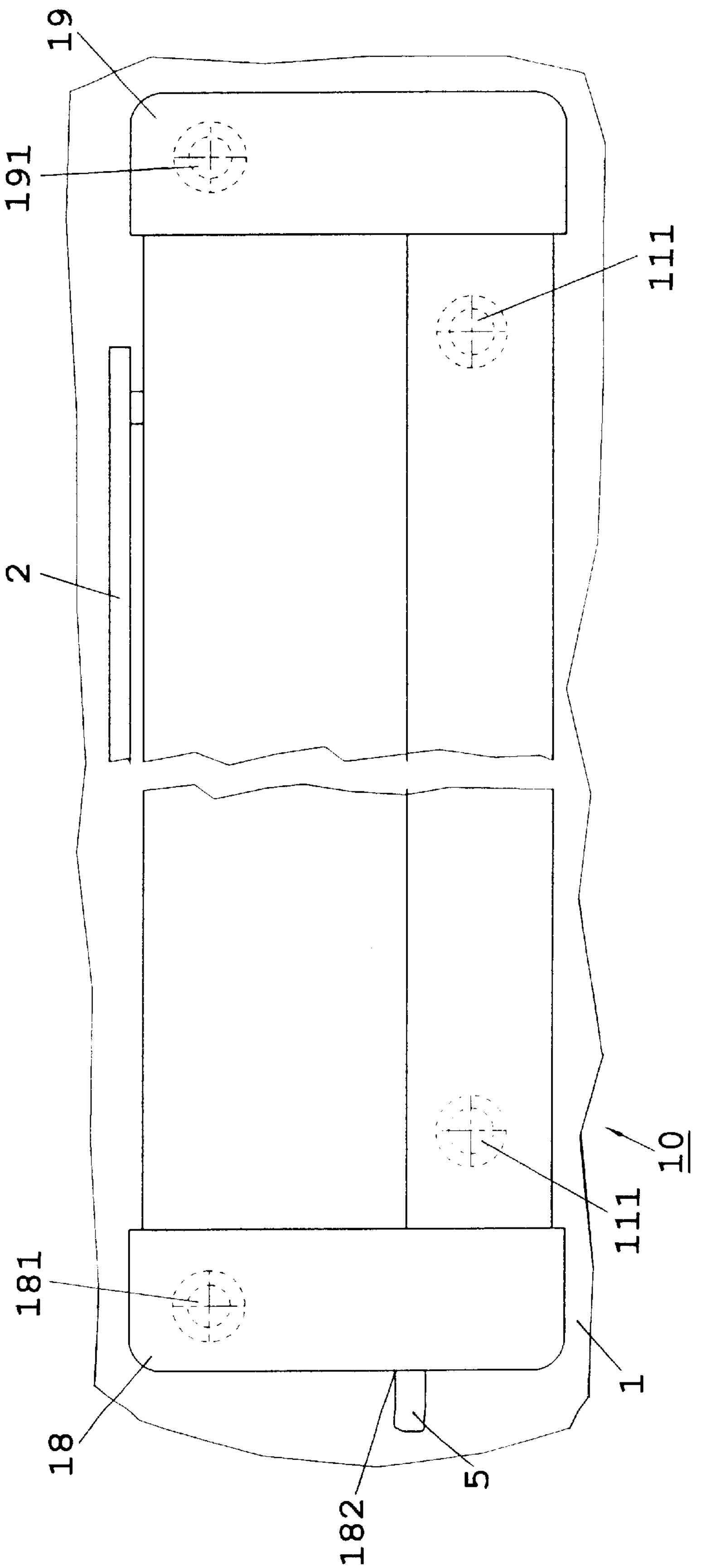
FIG. 2 is a head-on view of a slide rail of the present invention.

The slide rail 10 is preferably fastened to a door panel 1 as illustrated in FIG. 2.

Figure 3:
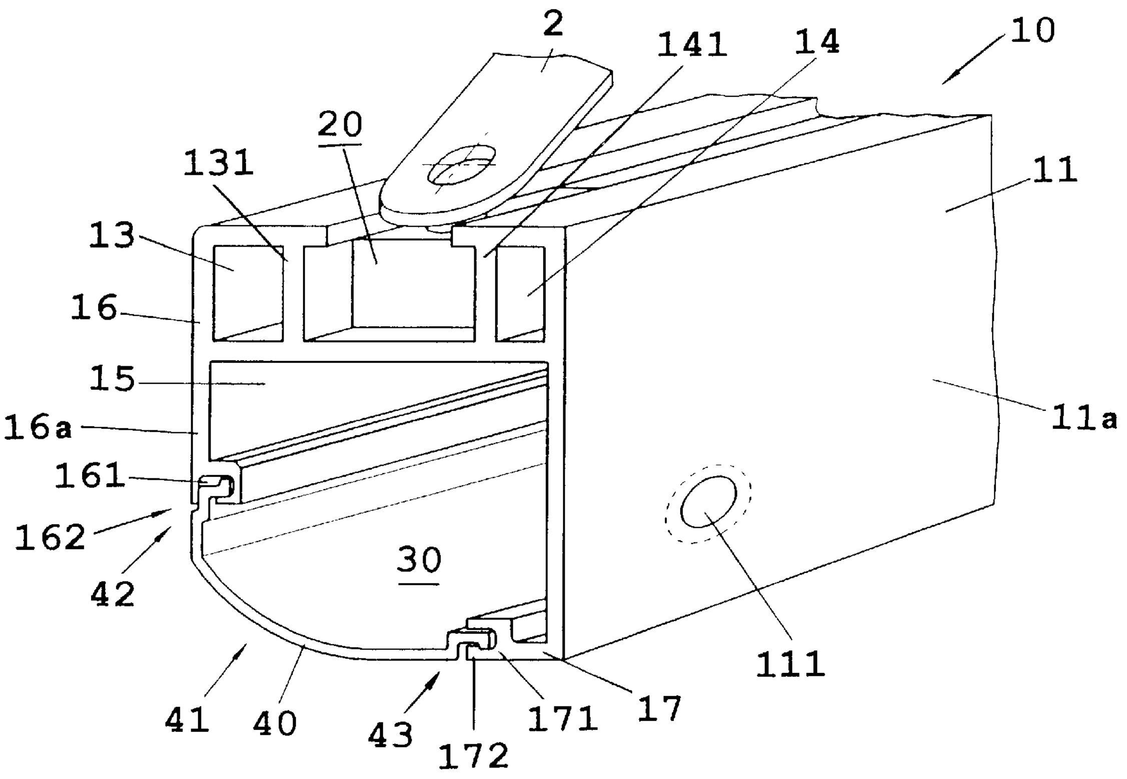
FIG. 3 is an isometric view of a side view of the slide rail of the present invention.
Figure 4:
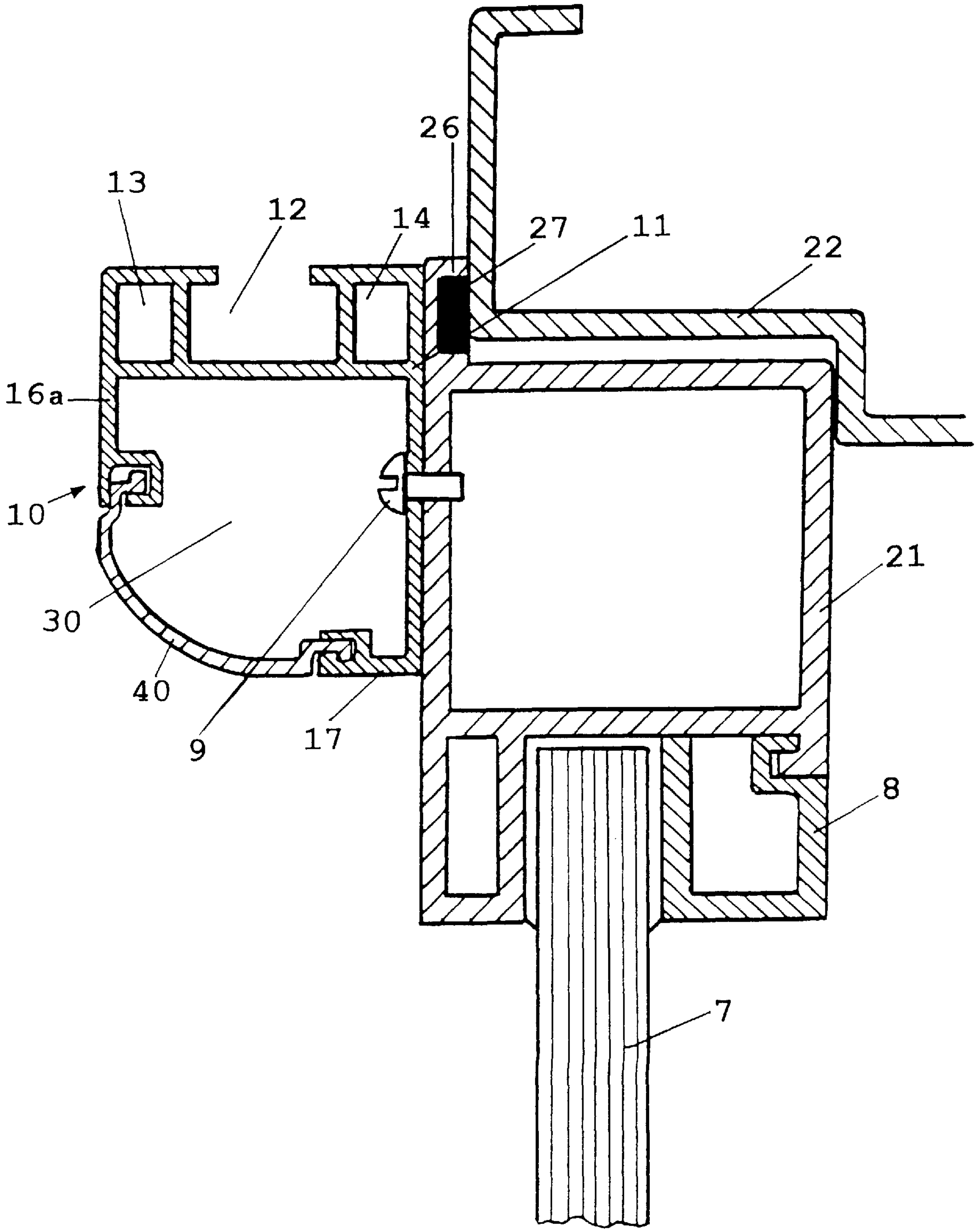
FIG. 4 shows a cross section of the slide rail with an additional top door profile.

FIG. 3 shows that the slide 20, which slide 20 can be connected with the lever 2 so that it can pivot, is guided so that the slide 20 can move axially in a guide groove 12 (see FIG. 4). The guide groove 12 can surround the slide 20. The lever 2 can be connected on its other end with a door drive mechanism or maneuvering mechanism 200 (see FIG. 6) and the door drive mechanism can be in turn connected to sensors 201.

In the vicinity of the guide groove 12, on both sides, there are preferably cavities 13, 14. The cavities 13, 14 can represent mechanical reinforcement in the form of reinforcing ribs 131 and 141 for the sides of the slide rail 10, and can also reduce the amount of material required.

A wall 11*a* of the contact side 11, by means of which the slide rail 10 is in contact with the door panel, can be extended downward and can be closed by an L-shaped reinforcement edge 17. The reinforcement edge 17 can be provided with a U-shaped groove 171. The groove 171 can extend axially along the slide rail 10 and, on at least one leg, can have an elevation 172.

To fasten the slide rail 10 to the door panel 1 or a lintel (not shown), there are preferably borings 111 in the lower portion of the wall 11*a* of the contact side 11. Through the holes or borings 111, fasteners such as wood or metal screws, toggle bolts etc. can be inserted.

The wall 16*a*, which wall 16*a* can form the front side 16, is also preferably extended downward, but is preferably only approximately one-half as long as the wall 11*a*, which wall 11*a* can form the rear contact side 11. On the end of the wall 16*a* of the front side 16 facing away from the guide groove 12, the front side 16 has a three-legged groove 161 which extends axially along the slide rail 10. The three-legged groove 161 leaves a gap 162, which gap 162 also extends axially along the slide rail 10.

The wall 16*a* of the front side 16 and the wall 11*a* of the contact side 11 can thus form, on the side 15 facing away from the guide groove 12, a space 30, in which space 30 one or more sensors 201 (see FIG. 6) can be installed. The sensors 201 are preferably conventional, commercially available sensors of an optical-electronic and/or radio-electronic type. The sensors 201 can be attached by conventional means such as screws, rivets, adhesives or clamps inside the space 30.

Between the walls 11*a* and 16*a* there remains an unoccupied opening 41, which opening 41 can be closed by a cover 40. The cover 40 can have an L-shaped edge 42, 43 on both sides.

When selecting the material for the cover 40, consideration must be given to the fact that the material must have the highest possible transmission rate for the optical-electronic and/or radio-electronic emissions from the sensors 201.

After the slide rail 10 has been installed on the door, the cover 40 with the L-shaped edges 42, 43 can simply be inserted into the axial grooves 161 and 171 and fastened in place when the door is open. The ends of the slide rail 10 can be covered with a cap 18, 19 (see FIG. 2).

The caps 18, 19 can be positively and/or non-positively engaged in the slide rail 10 or as illustrated in FIG. 2, the caps 18, 19 can enclose the slide rail 10 positively and/or non-positively. For the passage of the connecting lines 5 relating to the sensors 201, at least one of the caps 18 and/or 19 can have a pre-defined, openable or knocked-out open space 182. This passage or open space 182 can be created in injection-molded caps in the form of a predetermined breaking point. The passage 182, when the caps 18, 19 are made of die-cast moldings, can be in the form of holes which can be closed by plugs.

As shown in FIG. 2, the caps or covers 18, 19 can have borings 181, 191, by means of which borings 181, 191 the slide rail 10, which slide rail 10 is closed on each end by a cap 18, 19 is fastened to the door panel 1 in the conventional manner. The borings 181, 191 are preferably concealed with stoppers (not shown) which are inserted in the respective borings 181, 191.

The sectional drawing in FIG. 4 shows a profile 21 of a door panel 1. The glass panel 7 of the door panel 1 is preferably held by a glass strip 8. The profile 21 can thereby have a turned-down leg 26, in which leg 26 there is preferably a gasket or seal 27. The gasket 27 can be in contact against the profile of a door frame or casing 22. The view selected in FIG. 4 shows the door when it is closed. The purpose of this illustration is to demonstrate the invisible connection of the slide rail 10 to the profile 21 by fastening screws 9. The fastening screws 9 can be located inside the space 30 of the contact side 11. When the space 30 is covered by the cover 40, the fastening of the slide rail 10 is preferably no longer visible.

Figure 5:
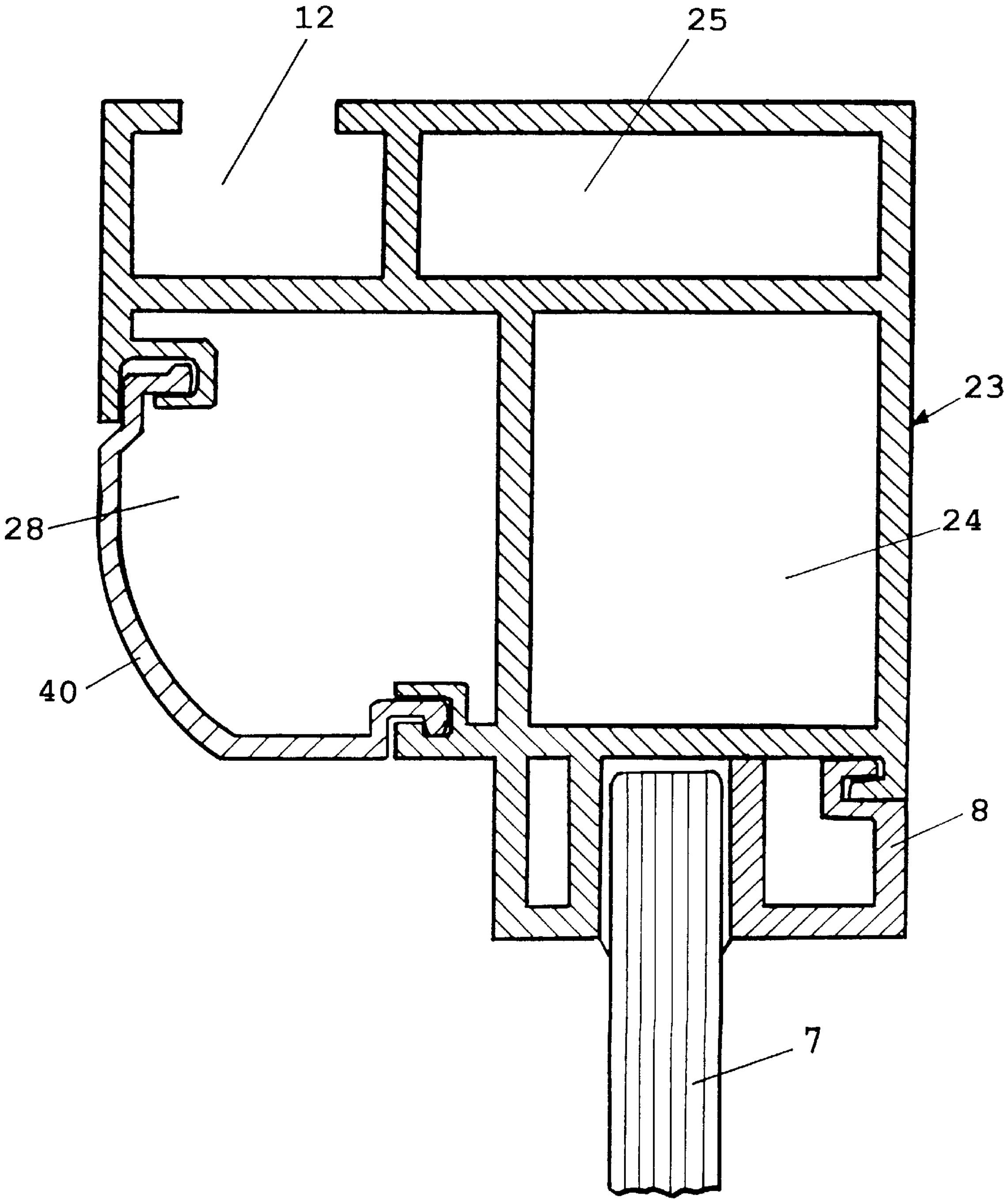
FIG. 5 shows the slide rail integrated into a top door profile.

In one configuration of the present invention, based on FIG. 4, in which a separate profile is used for the slide rail 10, in addition to the profile 21 of the door panel 1, a profile can be used which simultaneously integrates the slide rail 10 with a space 28 (see FIG. 5) enclosed inside it for a corresponding sensor system. The glass panel 7 is fastened in a known manner and is held inside the frame profile by the glass strip 8. This profile, which contains both the frame and the slide rail with the connected sensor system, is designated 23 (see FIG. 5). The profile 23 thereby has the following essential characteristics, namely: a guide groove 12 which functions as a slide rail 10 for a slide 20; a space 28 to hold a sensor system with the outside cover 20 connected to it; and at least two chambers 24 and 25 (see FIG. 5). The illustration in FIG. 5 shows such a profile 23 which is used for non-folding doors. It is also conceivable, however, that such a profile 23 can be provided with a turned-down leg, so that the profile 23 can simultaneously be used with folding doors. Such a profile 23 would represent a quasi-one-piece profile, although the profile illustrated in the figure is in two pieces.

As a result of the use of a one-piece profile, the overall construction of the slide rail function can become smaller, which also improves the overall appearance. Such a realization would not be noticeable to the observer, and would also reduce the cost of installation.

In one possible embodiment of the present invention, the slide rail 10 and sensors 201 could be used with a door that is manually opened and automatically closed by a door closing device. The sensors 201 could be used to detect any obstructions in the danger zone of the door, once the door closing device begins the closing process. The sensors 201 could trigger an alarm indicating that the path of the door is blocked. The sensors 201 could also send a signal to the door closing device to stop the closing process.

In another possible embodiment of the present invention, the slide rail 10 and sensors 201 could be used with a door that is automatically opened and closed with a drive mechanism or maneuvering mechanism 200. The sensors 201 could be used to detect an approaching individual and send a signal to the drive mechanism 200 to open the door. After the door is opened, the sensors 201 can be used to check the path of the door before and during the closing process. The sensors 201 can also activate an alarm or stop the closing process if an obstruction is detected during the closing process.

One feature of the invention resides broadly in the slide rail 10 with a guide groove 12 and a contact side 11 for a device for a door equipped with a slide rail door drive mechanism, whereby a slide 20 which is effectively connected to the door drive mechanism is mounted so that it can move axially in the guide groove 12, and the door area has at least one sensor which is effectively connected to the door device and scans the danger zone of the range of motion of the door, characterized by the fact that the slide rail 10 has a space 30 adjacent to the guide groove 12 which holds the slide 20, which space 30 contains at least one sensor which is used to monitor the danger zone of the door, whereby the space 30 can be located below, in front of or behind the guide groove 12.

Another feature of the invention resides broadly in the slide rail characterized by the fact that the slide rail 10 and the neighboring space 30 are integrated to hold at least one sensor in a profile 23 of the door panel 1.

Yet another feature of the invention resides broadly in the slide rail characterized by the fact that the space 30 is bounded on either side of the slide rail 10 in the longitudinal direction by the wall 11*a* which forms the contact side 11 and by a wall 16*a* which is located opposite the contact side 11 and forms the front side, and that the side 15 which faces away from the underside of the guide groove 12 forms an opening 41 which allows the passage of the radiation emitted by the sensor or sensors.

Still another feature of the invention resides broadly in the slide rail characterized by the fact that the space 30 is closed by a cover 40 which covers the space 30, can be connected to the slide rail 10, and allows the passage of the radiation emitted by the sensor or sensors.

A further feature of the invention resides broadly in the slide rail characterized by the fact that the cover 30 can be positively or non-positively plugged, clamped or inserted into the rear and front wall 11*a*, 16*a* of the slide rail 10.

Another feature of the invention resides broadly in the slide rail characterized by the fact that the walls which form the contact side 11 and the front side 16 have receptacles and the cover 40 has matching pieces which correspond to these receptacles.

Yet another feature of the invention resides broadly in the slide rail characterized by the fact that the area of the guide groove 12 has at least one cavity 13, 14 which is structurally and mechanically active.

Still another feature of the invention resides broadly in the slide rail characterized by the fact that the wall 11*a* which forms the contact side 11 has a reinforcement edge 17.

A further feature of the invention resides broadly in the slide rail characterized by the fact that to fasten the slide rail 10, there are predetermined openings 111 in the area of the contact side 11 which is accessible from the front.

Another feature of the invention resides broadly in the slide rail characterized by the fact that the slide rail 10 has caps 18, 19 which are fastened positively and/or non-positively on one or both ends into the slide rail, or which surround the slide rail.

Yet another feature of the invention resides broadly in the slide rail characterized by the fact that each cap 18, 19 has at least one opening 181, 191 for the fastening of the slide rail 10 and/or that at least one of the caps 18, 19 has a pre-defined opening 182 for the passage of connecting lines 5.

Still another feature of the invention resides broadly in the slide rail characterized by the fact that the slide rail 10 extends approximately over the width of the door panel 1.

A further feature of the invention resides broadly in the slide rail characterized by the fact that the profile 23 is used for non-folding doors.

Another feature of the invention resides broadly in the slide rail characterized by the fact that the profile 23 is used for folding doors.

Yet another feature of the invention resides broadly in the use of a slide rail characterized by the fact that the slide rail 10 is attached, even without a corresponding door drive mechanism, but is equipped with at least one sensor, on the side of the door facing away from the door drive, to monitor the danger zone located on that side.

Still another feature of the invention resides broadly in the semi-finished profile for a slide rail characterized by the fact that—viewed in the cross section of the profile—the wall 11*a* which forms the contact side has a U-shaped groove 171 which extends axially, whereby one of the two legs of the U-shaped groove 171 has an elevated portion 172 which also extends axially.

A further feature of the invention resides broadly in the semi-finished profile for a slide rail characterized by the fact that—viewed in the cross section of the profile—the wall 16*a* which forms the front side has an at least three-legged groove 161 which extends axially, whereby there is a gap 162 which extends axially between the wall 16*a* of the front side and the final leg.

Another feature of the invention resides broadly in the semi-finished profile of a cover 40 for a slide rail characterized by the fact that—viewed in cross section—the right and/or the left edge of the cover 40 forms an L-shaped edge 42, 43.

Yet another feature of the invention resides broadly in the semi-finished profile for a slide rail characterized by the fact that in the cross section of the profile 23 there is a guide groove 12, with a space 28 beneath it, to hold at least one sensor as well as two chambers 24 and 25.

Some examples of door closers or drive mechanisms which may possibly be used or adapted for use in the context of the present invention may be disclosed in the following U.S. Pat. Nos. 5,651,216 to Tillmann on Jul. 29, 1997; 5,625,266 to Stark on Apr. 29, 1997; 5,471,708 to Lynch on Dec. 5, 1995; 5,461,754 to Tillmann et al. on Oct. 31, 1995; 5,386,614 to Fayngersh on Feb. 7, 1995; 5,369,912 to Ginzel et al. on Dec. 6, 1994; and 5,311,642 to Tillmann et al. on May 17, 1994.

Some examples of slide rails or other rails which may possibly be used or adapted for use in the context of the present invention may be disclosed in the following U.S. Pat. Nos. 5,544,462 to Kordes on Aug. 13, 1996; 5,461,829 to Lehto et al. on Oct. 31, 1995; 5,417,013 to Tillmann on May 23, 1995; 5,394,648 to Kordes on Mar. 7, 1995; and 5,295,281to Kordes on Mar. 22, 1994.

Some examples of sensors and related components which may possibly be used or adapted for use in the context of the present invention may be disclosed in the following U.S. pat. Nos. 5,424,744 to Westphal on Jun. 13, 1995; 5,412,421 to Hale et al. on May 2, 1995; 5,406,256 to Ledel et al. on Apr. 11, 1995; 5,396,437 to Takahashi on Mar. 7, 1995; 5,393,978 to Schwarz on Feb. 28, 1995; 5,391,875 to Cederberg et al. on Feb. 21, 1995; 5,386,210 to Lee on Jan. 31, 1995; 5,381,011 to Sandell et al. on Jan. 10, 1995; and 5,381,009 to Brownell on Jan. 10, 1995.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 196 30 877.1, filed on Jul. 31, 1996, and International Application No. PCT/DE97/01488, filed on Jul. 15, 1997, having inventor Dietrich Jentsch, and DE-OS 196 30 877.1 and DE-PS 196 30 877.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A door comprising:

a door panel;

said door panel being configured and disposed to be movable between an open position and a closed position within a door jamb;

a maneuvering mechanism being configured and disposed to move said door panel from at least the open position to the closed position;

said maneuvering mechanism being operatively connected to said door panel;

said maneuvering mechanism comprising a rail structure;

said rail structure having an elongated dimension;

said rail structure being disposed immediately adjacent to said door panel and along the width of said door panel;

said rail structure being connected to said door panel;

said rail structure comprising a groove;

said groove being configured and disposed to extend along said elongated dimension of said rail structure;

said maneuvering mechanism comprising a slide;

said slide being configured and disposed to slide in said elongated groove along said elongated dimension of said rail structure;

said rail structure comprising an elongated space;

said elongated space being disposed along said elongated dimension of said rail structure;

said elongated space being disposed adjacent to said elongated groove;

at least one sensor;

said at least one sensor being disposed in said elongated space; and said at least one sensor being configured and disposed to monitor a range of movement of said door panel in a range of motion between the open position and the closed position.

2. The door according to claim 1, wherein:

said rail structure comprises a first side and a second side disposed opposite to said first side of said rail structure;

said first side of said rail structure is disposed adjacent to said door panel;

said maneuvering mechanism comprises a drive mechanism to move said door panel between the open position and the closed position;

said slide is operatively connected to said drive mechanism;

said maneuvering mechanism comprises a connecting line to connect said at least one sensor to said maneuvering mechanism; and said elongated space is one of a), b) and c):

a) disposed between said first side of said rail structure and said elongated groove;

b) disposed between said second side of said rail structure and said elongated groove; and c) disposed below said elongated groove.

3. The door according to claim 2, wherein:

said first side of said rail structure comprises a first wall;

said second side of said rail structure comprises a second wall;

said elongated groove comprises a third wall;

said elongated space is at least partially enclosed by said first wall, said second wall and said third wall;

said first wall, said second wall and said third wall being configured and disposed to form an opening for passage of radiation emitted by said at least one sensor;

said rail structure comprises a cover;

said cover is configured and disposed to cover said opening for passage of radiation emitted by said at least one sensor;

said cover comprises a material configured to permit passage of radiation emitted by said at least one sensor;

said cover is one of positively and non-positively connected to said first wall and said second wall;

said first wall comprises a first arrangement to receive said cover;

said second wall comprises a second arrangement to receive said cover;

said cover comprises a first end and a second end disposed opposite to said first end;

said first end of said cover is configured and disposed to mate and engage with said first arrangement to receive said cover; and said second end of said cover is configured and disposed to mate and engage with said second arrangement to receive said cover.

4. The door according to claim 3, wherein:

said first side of said rail structure comprises a front side and a back side disposed opposite to said front side;

said back side of said first side of said rail structure is configured and disposed to face said door panel;

said front side of said first side of said rail structure comprises at least one first hole to permit fastening of said rail structure to said door panel;

said rail structure comprises a first end and a second end disposed opposite to said first end;

said rail structure comprises at least one cap;

said at least one cap is at least one of positively and non-positively connected to at least one of said first end and said second end of said rail structure;

said at least one cap is one of d) and e):

d) disposed in said at least one of said first end and said second end of said rail structure; and e) disposed to surround said at least one of said first end and said second end of said rail structure; and said at least one cap comprises at least one of f) and g):

f) at least one second hole to permit connecting of said rail structure to said door; and g) at least one third hole to permit passage of said connecting line.

5. The door according to claim 4, wherein:

said door panel comprises a door profile;

said door profile comprises both said rail structure and said elongated groove;

said rail structure and said elongated groove are configured and disposed to form an integrated structure;

said door panel comprises at least one additional door profile;

said door panel comprises a glass panel;

said door profile and said at least one additional door profile are configured and disposed to hold said glass panel;

said door panel comprises a glass strip;

said glass strip is configured and disposed to secure said glass panel in said door profile and said at least one additional door profile;

said door profile comprises two chambers;

each of said two chambers is disposed adjacent to said elongated groove; and said elongated space is disposed below said elongated groove.

6. A door comprising:

a door panel;

said door panel being configured and disposed to be movable between an open position and a closed position within a door jamb;

a maneuvering mechanism being configured and disposed to move said door panel from at least the open position to the closed position;

said maneuvering mechanism being operatively connected to said door panel;

said maneuvering mechanism comprising a rail structure;

said rail structure being disposed immediately adjacent to said door panel;

said rail structure comprising a groove;

said groove being configured and disposed to extend along said rail structure;

said maneuvering mechanism comprising a slide;

said slide being configured and disposed to slide in said groove;

said rail structure comprising a space;

said space being disposed immediately adjacent to said groove;

at least one sensor;

said at least one sensor being disposed in said space; and said at least one sensor being configured and disposed to monitor a range of movement of said door panel between the open position and the closed position.

7. The door according to claim 6, wherein:

said rail structure comprises a first side and a second side disposed opposite to said first side of said rail structure;

said first side of said rail structure is disposed adjacent to said door panel;

said maneuvering mechanism comprises a drive mechanism to move said door panel;

said slide is operatively connected to said drive mechanism;

a connecting line to connect said at least one sensor to said maneuvering mechanism; and said space is one of a), b) and c):

a) disposed between said first side of said rail structure and said groove;

b) disposed between said second side of said rail structure and said groove; and c) disposed below said groove.

8. The door according to claim 7, wherein:

said door panel comprises a door profile;

said door profile comprises both said rail structure and said groove; and said rail structure and said groove are configured and disposed to form an integrated structure.

9. The door according to claim 8, wherein:

said first side of said rail structure comprises a first wall;

said second side of said rail structure comprises a second wall;

said groove comprises a third wall;

said space is at least partially enclosed by said first wall, said second wall and said third wall; and said first wall, said second wall and said third wall being configured and disposed to form an opening for passage of radiation emitted by said at least one sensor.

10. The door according to claim 9, wherein:

said rail structure comprises a cover;

said cover is configured and disposed to cover said opening for passage of radiation emitted by said at least one sensor;

said cover comprises a material configured to permit passage of radiation emitted by said at least one sensor;

said cover is one of positively and non-positively connected to said first wall and said second wall; and said cover is one of d), e) and f):

d) plugged into said first wall and said second wall;

e) clamped into said first wall and said second wall; and f) inserted into said first wall and said second wall.

11. The door according to claim 10, wherein:

said first wall comprises a first arrangement to receive said cover;

said second wall comprises a second arrangement to receive said cover;

said cover comprises a first end and a second end disposed opposite to said first end;

said first end of said cover is configured and disposed to mate and engage with said first arrangement to receive said cover; and said second end of said cover is configured and disposed to mate and engage with said second arrangement to receive said cover.

12. The door according to claim 11, wherein:

said groove comprises at least one reinforcing rib;

said at least one reinforcing rib being disposed substantially perpendicular to said third wall;

said rail structure comprises at least one cavity;

said at least one cavity is configured and disposed to be mechanically and structurally active; and said at least one cavity is disposed adjacent to said at least one reinforcing rib.

13. The door according to claim 12, wherein:

said first side of said rail structure comprises a front side and a back side disposed opposite to said front side;

said back side of said first side of said rail structure is configured and disposed to face said door panel;

said front side of said first side of said rail structure comprises at least one first hole to permit fastening of said rail structure to said door panel;

said rail structure comprises at least one screw disposed in said at least one first hole to connect said rail structure to said door panel;

said rail structure comprises a first end and a second end disposed opposite to said first end;

said rail structure comprises at least one cap;

said at least one cap is at least one of positively and non-positively connected to at least one of said first end and said second end of said rail structure;

said at least one cap is one of g) and h):

g) disposed in said at least one of said first end and said second end of said rail structure; and h) disposed to surround said at least one of said first end and said second end of said rail structure; said at least one cap comprises at least one of i) and j):

i) at least one second hole to permit connecting of said rail structure to said door; and j) at least one third hole to permit passage of said connecting line;

said door panel has a substantial width;

said groove extends substantially along the entire width of said door panel; and said door profile is configured and disposed to be used with one of a folding door and a non-folding door.

14. The door according to claim 13, wherein:

said groove is a first groove;

said first arrangement to receive said cover comprises a reinforcement edge;

said reinforcement edge comprises a second groove;

said second groove is substantially U-shaped;

said second groove is configured and disposed to extend along said rail structure;

said second groove comprises two legs;

one of said two legs of said second groove comprises an elevation disposed to extend along said rail structure;

said second arrangement to receive said cover comprises a third groove;

said third groove is configured and disposed to extend along said rail structure;

said third groove comprises at least three legs;

said at least three legs are configured and disposed to form a gap between said second wall and one of said at least three legs;

at least one of said first end and said second end of said cover comprises an L-shaped edge;

said door panel comprises at least one additional door profile;

said door panel comprises a glass panel;

said door profile and said at least one additional door profile are configured and disposed to hold said glass panel;

said door panel comprises an arrangement to secure said glass panel in said in said door profile and said at least one additional door profile;

said door profile comprises two chambers;

each of said two chambers is disposed adjacent to said first groove; and said space is disposed below said first groove.

15. The door according to claim 14, wherein:

said door panel comprises a first side and a second side disposed opposite to said first side;

said drive mechanism is disposed on said first side of said door panel;

said rail structure is a first rail structure;

said maneuvering mechanism comprises a second rail structure;

said second rail structure is disposed on said second side of said door panel;

said at least one sensor is at least one first sensor;

said door comprises at least one second sensor;

said at least one second sensor is connected to said maneuvering mechanism; and said at least one second sensor is disposed in said second rail structure to monitor a range of movement of said second side of said door panel in a range of motion between the open position and the closed position.

16. A maneuvering mechanism for a door to move a door panel from an open position to a closed position, said maneuvering mechanism comprising:

a rail structure;

said rail structure being disposed immediately adjacent to the door panel;

said rail structure comprising a groove;

said groove being configured and disposed to extend along the rail structure;

a slide;

said slide being configured and disposed to slide in said groove;

said rail structure comprising a space;

said space being disposed immediately adjacent to said groove;

at least one sensor;

said at least one sensor being disposed in said space; and said at least one sensor being configured and disposed to monitor a range of movement of the door panel between the open position and the closed position.

17. The maneuvering mechanism according to claim 16, wherein:

said rail structure comprises a first side and a second side disposed opposite to said first side of said rail structure;

said first side of said rail structure is disposed adjacent to the door panel;

said maneuvering mechanism comprises a drive mechanism to move said door panel;

said slide is operatively connected to said drive mechanism;

a connecting line to connect said at least one sensor to said drive mechanism; and said space is one of a), b) and c):

a) disposed between said first side of said rail structure and said groove;

b) disposed between said second side of said rail structure and said groove; and c) disposed below said groove.

18. The maneuvering mechanism according to claim 17, wherein:

said first side of said rail structure comprises a first wall;

said second side of said rail structure comprises a second wall;

said groove comprises a third wall;

said space is at least partially enclosed by said first wall, said second wall and said third wall; and said first wall, said second wall and said third wall being configured and disposed to form an opening for passage of radiation emitted by said at least one sensor.

19. The maneuvering mechanism according to claim 18, wherein:

said rail structure comprises a cover;

said cover is configured and disposed to cover said opening for passage of radiation emitted by said at least one sensor;

said cover comprises a material configured to permit passage of radiation emitted by said at least one sensor;

said cover is one of positively and non-positively connected to said first wall and said second wall;

said cover is one of d), e) and f):

d) plugged into said first wall and said second wall;

e) clamped into said first wall and said second wall; and f) inserted into said first wall and said second wall;

said first wall comprises a first arrangement to receive said cover;

said second wall comprises a second arrangement to receive said cover;

said cover comprises a first end and a second end disposed opposite to said first end;

said first end of said cover is configured and disposed to mate and engage with said first arrangement to receive said cover; and said second end of said cover is configured and disposed to mate and engage with said second arrangement to receive said cover.

20. The maneuvering mechanism according to claim 19, wherein:

said first side of said rail structure comprises a front side and a back side disposed opposite to said front side;

said back side of said first side of said rail structure is configured and disposed to face the door panel;

said front side of said first side of said rail structure comprises at least one first hole to permit fastening of said rail structure to the door panel;

said rail structure comprises a first end and a second end disposed opposite to said first end;

said rail structure comprises at least one cap;

said at least one cap is at least one of positively and non-positively connected to at least one of said first end and said second end of said rail structure;

said at least one cap is one of g) and h):

g) disposed in said at least one of said first end and said second end of said rail structure; and h) disposed to surround said at least one of said first end and said second end of said rail structure; said at least one cap comprises at least one of i) and j):

i) at least one second hole to permit connecting of said rail structure to the door; and j) at least one third hole to permit passage of said connecting line;

said groove is a first groove;

said first arrangement to receive said cover comprises a reinforcement edge;

said reinforcement edge comprises a second groove;

said second groove is substantially U-shaped;

said second groove is configured and disposed to extend along said rail structure;

said second groove comprises two legs;

one of said two legs of said second groove comprises an elevation disposed to extend along said rail structure;

said second arrangement to receive said cover comprises a third groove;

said third groove is configured and disposed to extend along said rail structure;

said third groove comprises at least three legs;

said at least three legs are configured and disposed to form a gap between said second wall and one of said at least three legs; and at least one of said first end and said second end of said cover comprises an L-shaped edge.

* * * * *